No. 795,895. PATENTED AUG. 1, 1905.
W. H. CONROY.
PLOW WHEEL.
APPLICATION FILED JULY 25, 1904.
2 SHEETS—SHEET 1.
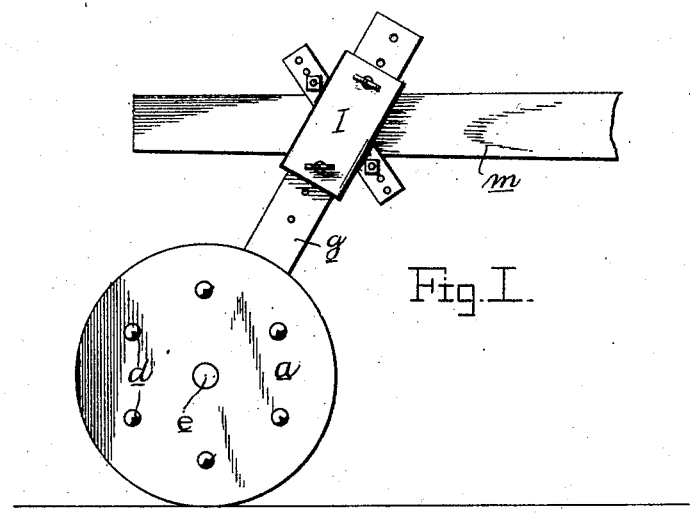
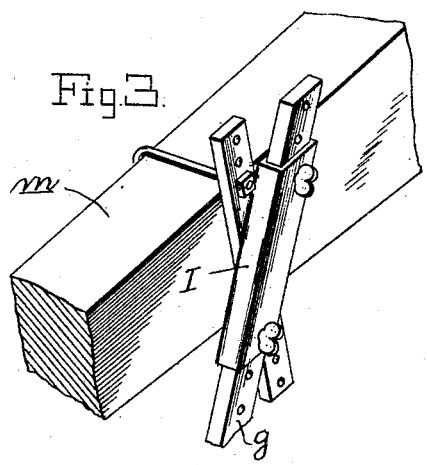

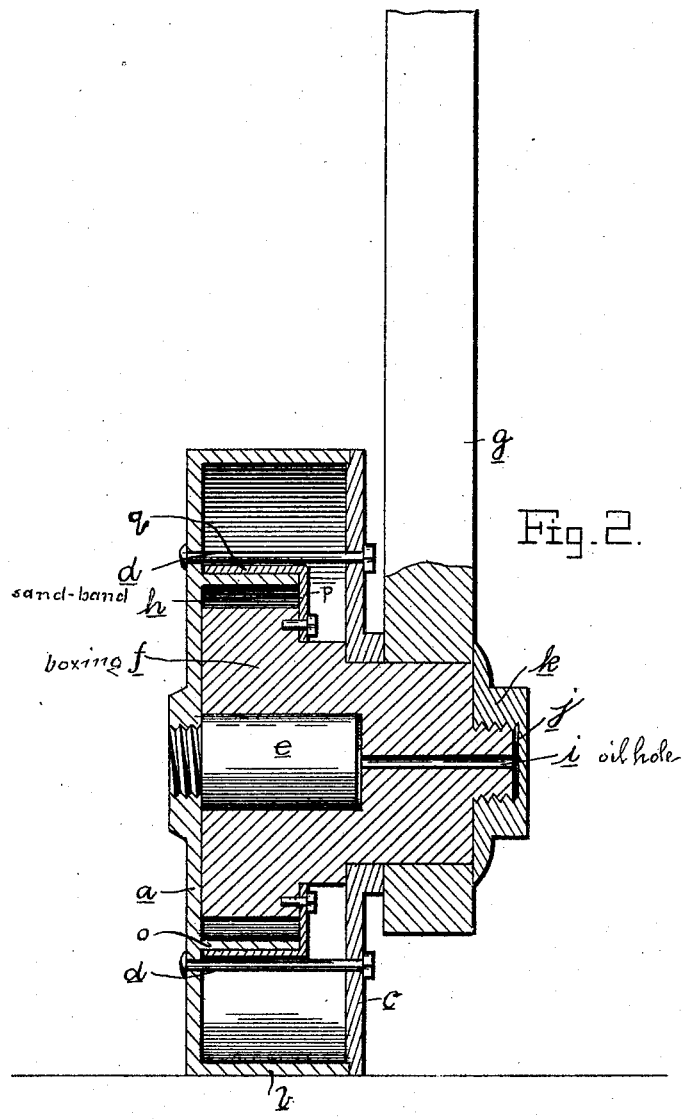

UNITED STATES PATENT OFFICE.

WILLIAM H. CONROY, OF MESICK, MICHIGAN.

PLOW-WHEEL.

No. 795,895.            Specification of Letters Patent.            Patented Aug. 1, 1905.

Application filed July 25, 1904. Serial No. 218,090.

*To all whom it may concern:*

Be it known that I, WILLIAM H. CONROY, a citizen of the United States, residing at Mesick, in the county of Wexford, State of Michigan, have invented certain new and useful Improvements in Plow-Wheels; and I do hereby declare the following to be a full, clear, and exact description of the invention, such as will enable others skilled in the art to which it appertains to make and use the same.

This invention has relation to plow-beam wheels; and it has for its object the provision of means whereby the axle of the plow-beam wheel may be made to all intents and purposes free from dust and sand and be lubricated as is any other journal and bearing performing similar functions with similar beneficial results. I have ascertained, however, that by providing the wheel with a "sand-band," so called, and securing a construction whereby the journal and bearing or the beam-wheel may be lubricated, as is the case with any other well-constructed machinery, the ends of economy and efficiency are highly subserved, as well as much annoyance avoided.

My invention consists of the improvements that I have hereinafter shown and described, the annexed drawings being relied upon to a great extent to make clear the construction and mode of operation of the invention. The said drawings and letters of reference marked thereon form a part of this specification, and the letters designate the same parts or features wherever they occur throughout the several views.

Of the said drawings, Figure 1 is a side view of the end of a plow-beam equipped with one of my improved wheels complete. Fig. 2 is a horizontal central sectional view of the same. Fig. 3 shows the manner of attaching the improved wheel to the beam and adjusting it in the standard.

My improved wheel *per se*, is constructed of two parts, forming a cylindrical shell, it may be said—namely, the outside side or face $a$ and the tread $b$ and the inside side plate $c$, which are united by bolts and nuts $d$, so as to constitute a perfect wheel. I have simply chosen to make the outside or face plate and tread as a unitary part; but it will be understood that they may be made separately and united in a desirable mechanical way by the bolts, or the inside face-plate and tread may be made as one, these variations in the manner of construction being unimportant in the invention.

The center of the outside face-plate $a$ is apertured and adapted to receive and have the outside end of the axle $e$ firmly secured thereto. This axle will be made of suitable metal and be made to extend inwardly to or beyond the inside side plate $c$.

$f$ constitutes the boxing and is made to surround the axle $e$ within the wheel proper and to extend through and beyond the inner side plate and to be secured by appropriate appliances to the standard $g$ and to be provided with means of lubricating the axle, as well also as a nut and cap to assist in finishing the contrivance. From the inner face of the plate $a$, concentric with the axle $e$, there projects an annular flange $o$. The end of the boxing $f$ next the plate $a$ is somewhat increased in diameter, as shown, and against that face of its enlarged portion adjacent to the plate $c$ there is secured a sand-band consisting of a disk $p$ at right angles to the axis of the boxing and at the outer edge of which is an annular flange $q$, which encircles and fits closely and rotatably about the flange $o$. In this way such dirt as may enter the shell is prevented from finding its way to the bearing-faces of the boxing and axle. An oil-hole $i$ extends through from the inner end of the boxing to the end of the axle, so that the latter and its bearing may be freely lubricated when desired. The extreme inner end of the boxing will be screw-threaded to receive a cap $j$ or other similar device to cover the oil-hole and a nut $k$, which may be turned up to attach the wheel to the standard of the plow-beam. The cap and nut may be formed in one part or made separately, as desired. In this way it will be seen that the wheel and its journal may be kept free from sand and grinding-dirt and be caused not only to run true and be kept in certain position, but much power is saved in their operation, as well as much economy is subserved in point of use by reason of getting rid of the often needed. In this connection it is to be noted that the wheel proper fits closely around the boxing and of itself serves well the purpose of keeping out dirt and sand, though the sand-band is required to accomplish this end completely.

$i$ indicates a casting that is adapted to be secured to different-sized plow-beams $m$ by devices of different size. The standard $g$ of the wheel is adapted to be worked up and down in this casting, so as to adjust it to different heights, it being secured in place by a thumb screw or screws or other suitable means.

It will be seen from the foregoing description that many changes other than those mentioned may be made in the construction and arrangement of parts without departing from the nature and spirit of the invention.

What is claimed is—

1. A wheel of the class described comprising a cylindrical shell, an axle fixed to the shell projecting from the center of one end of the shell and lying wholly within the shell, the opposite end of the shell having a central opening therethrough, and a boxing fitted in said central opening and having a bearing in which the axle is rotatably received, said boxing at its outer end exterior to the shell being adapted for attachment to a standard.

2. A wheel of the class described comprising a wholly cylindrical shell, an axle engaged centrally of one end of the shell and lying entirely within the shell, the opposite end of the shell having a central opening, a boxing rotatably engaged in said central opening and adapted at its outer end for attachment to a standard, the inner end of the boxing having a bearing in which the axle is rotatably received, a sand-band carried by the boxing and an annular flange projecting from the face of the shell through which the axle projects and lying within and in close relation to the sand-band.

In testimony whereof I affix my signature in presence of two witnesses.

WILLIAM H. CONROY.

Witnesses:
  FLOYD E. OLIVER,
  FRANK CONROY.